United States Patent
Coakley et al.

(10) Patent No.: US 9,337,661 B2
(45) Date of Patent: May 10, 2016

(54) POWER MANAGEMENT SYSTEM AND METHOD

(71) Applicant: INTEL CORPORATION, Santa Clara, CA (US)

(72) Inventors: Matthew Coakley, Hillsboro, OR (US); Alexander B. Uan-Zo-Li, Hillsboro, OR (US); Jorge P. Rodriguez, Portland, OR (US); Basavaraj B. Astekar, Hillsboro, OR (US); Gary L. Bookhardt, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 13/728,171

(22) Filed: Dec. 27, 2012

(65) Prior Publication Data

US 2014/0184143 A1 Jul. 3, 2014

(51) Int. Cl.
*H02J 7/00* (2006.01)
*H02J 4/00* (2006.01)

(52) U.S. Cl.
CPC . *H02J 4/00* (2013.01); *H02J 7/007* (2013.01); *H02J 7/0063* (2013.01); *H02J 2007/0067* (2013.01); *Y10T 307/549* (2015.04)

(58) Field of Classification Search
CPC .......... H02J 4/00; H02J 7/007; H02J 7/0063; H02J 2007/0067; Y10T 307/549
See application file for complete search history.

(56) References Cited

U.S. PATENT DOCUMENTS

| | | | |
|---|---|---|---|
| 8,127,155 B2 | 2/2012 | Baarman et al. | |
| 2001/0040486 A1 | 11/2001 | Kpodzo et al. | |
| 2005/0111560 A1 | 5/2005 | Haines | |
| 2008/0106232 A1* | 5/2008 | Idzik et al. | 320/103 |
| 2011/0121653 A1* | 5/2011 | Hartular et al. | 307/66 |
| 2011/0234151 A1* | 9/2011 | Uan-Zo-Li et al. | 320/107 |
| 2011/0266873 A1* | 11/2011 | Tsuji | 307/66 |
| 2012/0139500 A1 | 6/2012 | Ye et al. | |
| 2012/0166676 A1* | 6/2012 | Roper et al. | 709/250 |
| 2012/0176946 A1 | 7/2012 | Hunt et al. | |
| 2012/0303173 A1 | 11/2012 | Covaro et al. | |

FOREIGN PATENT DOCUMENTS

| | | |
|---|---|---|
| CN | 102055039 A | 5/2011 |
| TW | 200945723 A | 11/2009 |
| WO | 2014/105230 A1 | 7/2014 |

OTHER PUBLICATIONS

International Search Report and Written Opinion for PCT/US2013/061532 dated Jan. 7, 2014.
Taiwanese Office Action for Application 102147983 dated Apr. 22, 2015 and English language translation.
Taiwanese Search Report for Application 102147983 dated Apr. 22, 2015 and English language translation.

* cited by examiner

*Primary Examiner* — Nha Nguyen
(74) *Attorney, Agent, or Firm* — KED & Associates LLP

(57) ABSTRACT

An apparatus including a storage area to store instructions and a controller to control power in a first device based on the instructions. In operation, the controller generates one or more signals to combine power from a first power source and a second power source for a hybrid power operation. The controller is to generate the one or more signals based on a connection state of the first device, multiple connection states of the first device, a charge level of a battery of the first device, or a combination thereof.

20 Claims, 8 Drawing Sheets

POWER MANAGEMENT SYSTEM AND METHOD

FIELD

One or more embodiments described herein relate to power management.

BACKGROUND

Smart phones, notebook computers, pad- and pod-type devices, tablets and other kinds of information and media terminals have gained widespread popularity and continue to evolve in terms of performance, size, and functionality. Whether mobile or stationary, these devices suffer from various drawbacks including poor or inadequate power management. As a result of these and other limitations, usefulness is impaired and convenience to the user is seriously hindered.

DETAILED DESCRIPTION

Figure 1:
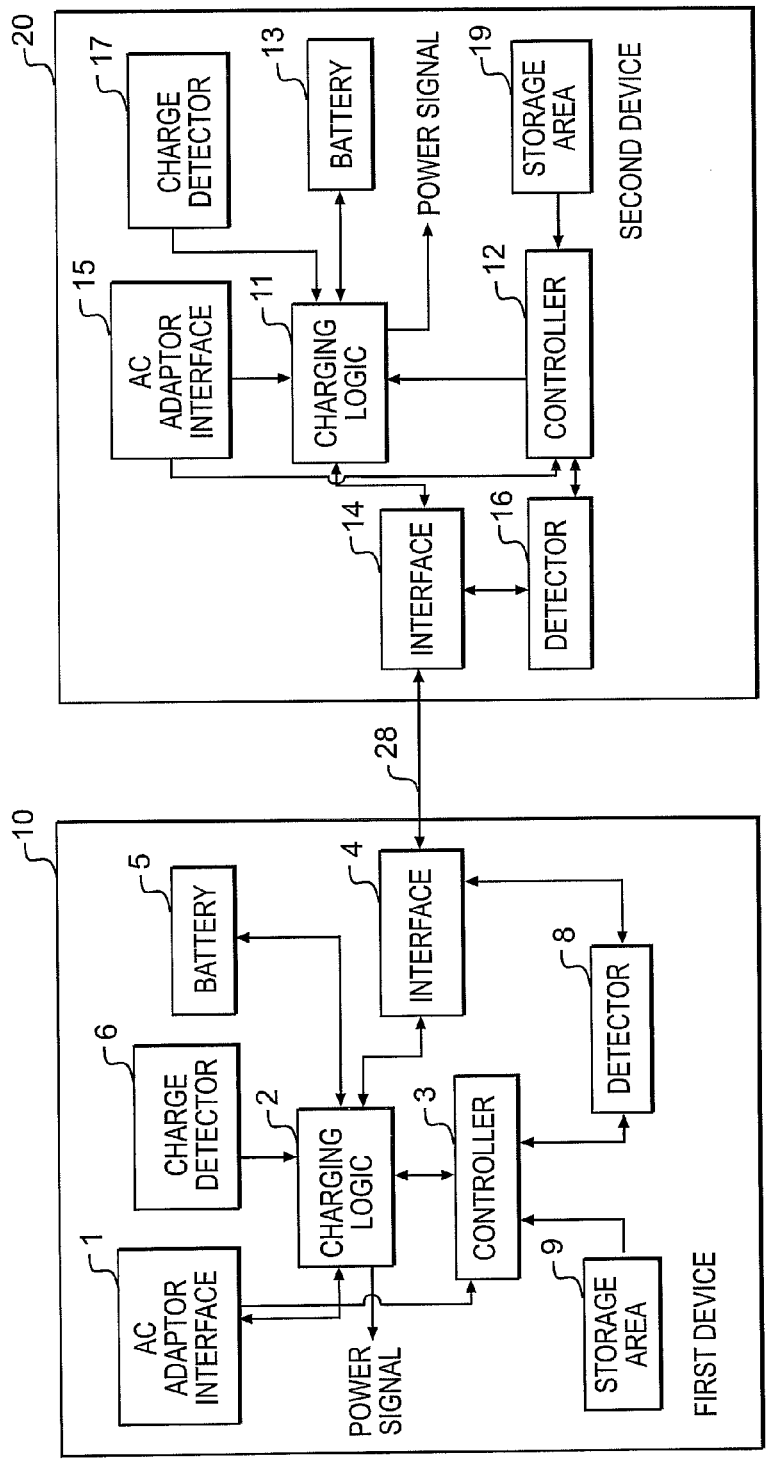
FIG. 1 shows one embodiment of a power management system.

FIG. 1 shows one embodiment of a system that manages power in at least one of two electronic devices 10 and 20 adapted to be coupled to one another. In this system, power is controlled in one or both devices based on conditions which include the mode of operation of the device(s), the connection state of the devices to one another, the connection state of an alternating current (AC) power source to one or both devices, and/or remaining charge in a battery of one or more of the devices.

In one implementation, the system controls whether one or both devices can enter a particular mode or multiple operational modes at the same time, based on the connection state(s) of the device(s) and/or the remaining charge levels of the device battery or batteries.

A first mode of operation to be controlled is a hybrid power operation. This operation involves drawing power from multiple power sources simultaneously in order to control functions to be performed by one of the devices. Performance of the hybrid power operation, therefore, first depends on whether multiple power sources are available and then whether conditions are appropriate (e.g., based connection state(s) and charge levels) for drawing power from those sources, as determined, for example, by the control firmware of the system.

At least one of the devices 10 or 20 may have circuitry to receive power from two power sources at the same time. The combined power from these sources (which may be referred to as hybrid power) may then be used for battery charging, to provide power for certain functions of the device, or both. The multiple power sources may include two or more of battery power in a device, power from an AC adaptor coupled to that device, or power from the other device when devices 10 and 20 are connected.

The hybrid power will allow sufficient charge in a device battery to be maintained above a minimum or other threshold level, for example, to ensure that when the devices are detached the device containing the battery has sufficient time and energy to operate various modes and/or to perform other functions as detailed herein. According to one example, the power management system may control the supply of hybrid power to one or more of the devices based on Hybrid Power Boost technology provided by Intel Corporation. In other embodiments, a different type of hybrid power control may be used.

A second mode of operation to be controlled is a boost operation. The boost operation may involve increasing the draw of power from one or more power sources in order to enhance performance of a particular processor and/or or function of a device. The increased power draw may be performed for a predetermined period of time, until a certain workload, function, or operation is completed, and/or until a certain battery charge level is reached, in the event that the one or more power sources is a device battery.

In accordance with one example, the boost operation may be performed based on Turbo Boost technology provided by Intel Corporation. This technology may be implemented when one or both devices are equipped with a processor (or multiple processors), such as Intel Core i5 and Core i7 processors, that allow processor performance to be dynamically increased on demand. Under some configurations, the core processor frequency is increased in response to a request for higher performance, initiated either by one or more user-initiated functions or based on control software in the device, e.g., performance of a security scan or other operation.

According to one implementation, when the processor is operating below its thermal and electrical limits and the user and/or device workload demands additional performance, the processor clock frequency will dynamically increase. The increase may allow the processor core(s) to run faster than a base operating frequency, if processor(s) are operating below rated power, temperature, and/or current specification limits. (In a multiple-core implementation, the core processors may have the same or different base operating frequencies and/or the increase in clock frequencies may be the same or different based on specification limits or other constraints).

In performing a boost operation, the increase in clock frequency may be performed incrementally (e.g., at predetermined intervals) until the upper limit of the processor clock frequency is met or until the maximum possible upside for the number of active cores is reached or until thermal and/or electrical limits (e.g., central processing unit (CPU), voltage regulators (VRs) and/or other system components) are breached. When any of the specification limits are reached or exceeded, the processor clock frequency may automatically decrease incrementally (at the same or a different interval) until the processor is again operating within its limits.

The increase in frequency may be performed, at least in part, based on the power state of the core processor(s) or the power state of one or more other circuits or functions of the host device. The power states may correspond to Advanced Configuration and Power Interface (ACPI) states or another type of power state standard.

The number of active cores at any given time may determine an upper frequency limit for the boost operation. When ACPI states are implemented in the device, a processor core may be considered to be in an active state if the core processor is in a C0 or C1 state. Cores in other states (e.g., C3 or C6) may be considered inactive in this scenario. According to one example, one processor may allow up to two frequency steps (e.g., 266.66 MHz) when one core is active and may allow one frequency step (e.g., 133.33 MHz) when two or more cores are active. Therefore, in a multi-core embodiment, a higher deep C-state residency (e.g., C3 or C6) on some cores may result in increased core frequency on the active core(s).

Another operational mode contemplates the performance of a hybrid power operation and a boost operation at the same time. These operations may be combined based on the charge in a battery of a host device. For example, the increased processor frequency required by the boost operation may be performed by initially drawing extra power solely from a battery of a host device.

However, when the power draw becomes excessive (e.g., exceeds specification limits of the battery) and/or the charge in the battery falls below a certain threshold (e.g., a predetermined value set to ensure that the battery has at least a minimum amount of charge to support, for example, operation of the device for a predetermined time or to meet a predetermined load in a detached state), a hybrid power operation may be performed to supply additional power from another source. The additional power provided from the other source may be coupled with the battery power draw to decrease the rate of decrease in charge from the battery in order to meet the frequency requirements of the boost operation.

The power management system of FIG. 1 may therefore control power in a way that ensures that at least a minimum charge is retained in the battery of at least one device at any given time, so that a reasonable (e.g., predetermined amount of) battery charge is retained to support operation should the devices 10 and 20 be detached.

Referring back to FIG. 1, the coupling between devices 10 and 20 may be a removable coupling that includes at least an electrical connection between the devices and, in some cases, also a physical mounting of one device to the other. At least one of the devices has a battery which is charged or discharged under various circumstances including at times when the devices are electrically connected and are not electrically connected.

The first device 10 includes an alternating current (AC) adaptor interface 1 which receives power from a wall outlet or other power source (e.g., another battery, a solar panel, etc.). Power from the AC adaptor may be transferred to charge a battery of the second device under a predetermined scheduling or control priority, to be discussed in greater detail below.

The first device may also include charging logic 2, a controller 3, and an interface circuit 4. The charging logic controls the transfer of power from the AC adaptor to the second device through the interface circuit under control of the controller. If the first device also includes a battery 5, the charging logic also controls charging of this battery using the AC adaptor power and, in some embodiments, power from the battery may also be transferred to charge the battery of the second device or power from the second device may under certain conditions be received from the second device to charge battery 5.

The charging logic 2 may be implemented in software (e.g., firmware, operating system software, or another type or code or instructions), hardware or a combination of both, and the same is true of the controller 3. Examples of control algorithms implemented by the charging logic and/or controller are given in latter portions of this description. The control algorithms and/or instructions (e.g., firmware or other code) for controlling the controller 3 for performing power management operations as described herein may be stored in storage area 9.

As shown, the charging logic 2 may output a power signal for powering operation of the first device based, for example, on power from the AC adaptor interface 1, battery 5, or both. The charging logic 2 may perform these operations based, at least in part, based on signals from controller 3. In another embodiment, the charging logic may operation independently from this controller based, for example, on the operation of hardware circuits, in order to control performance of the power management operations described herein.

The first device may also include a battery charge detector 6 to determine the remaining charge of battery 5. The battery charge detector may generate a signal indicative of the charge level of the battery for input into charging logic 2 or this signal may be input into controller 3 depending, for example, on firmware or other instructions. In another embodiment, the charging logic may perform the operation of detecting the charge level of battery 5. The charge level may be also determined by a controller inside the battery and be reported through the digital line (e.g., a system management bus (SMBus)) to the controller.

The second device 20 includes charging logic 11, a controller 12, a battery 13, and an interface circuit 14. The charging logic controls charging of battery 13 based on power received from the first device through the interface circuits, under control of the controller 12. The charging logic may be implemented in hardware or software (e.g., firmware, operating system software, or another type or code or instructions), or both, and the controller may be controlled to do the same. The controller may correspond to a central processing unit of the second device or another type of processor, and a storage area 19 is included for storing instructions (e.g., firmware or other code) for controlling the controller to perform any of the power management operations (e.g., charging, discharging, boost operation, hybrid power operation, etc.) described herein.

The interface circuits 4 and 14 may be compatible with any one of a number of standards including a Universal Serial Bus (USB) standard or another type of interface standard and a corresponding set of connectors, cable, or other interface medium 28 may be included. The interface circuit may include data pins and/or control pins in addition to power pins for transferring power uni-directionally or bi-directionally between the device. In accordance with another embodiment, an inter-integrated circuit (12C) or system management bus (SMBus) may be used because, for example, these interfaces may have fewer pins with lower power consumption and may be easier to implement.

In accordance with one embodiment, the second device may also include or be connected to an AC adaptor circuit 15 to receive power to control operation of and/or charge the battery of the second device. The conditions under which the charging logic 11 uses power from the AC adaptor interface or from the battery of the first device may be determined based on the control software.

The AC adaptors of the first and second devices may output detection or identification signals to one or more of the controllers of the devices. These detection signals may be interpreted by the controller(s) as events which trigger a specific function to be performed relating to power management. The detection signal may have a first logic value to indicate that AC power has been connected to an adaptor interface and a second logic signal to indicate that AC power has been disconnected from an interface. The signal may also indicate the adapter output direct current (DC) power rating and its transient output power rating.

Based on these detection signals, the controller may generate control signals, for example, to cause the battery of one or both devices to be charged using the AC power (e.g., when AC power is connected) and/or to cause battery power to control operations in respective ones of the devices (e.g., when AC power is disconnected), and/or to cause the power from the battery of one device to charge the batter of the other device.

The second device may also include a battery charge detector 17 to determine the remaining charge of battery 13. The battery charge detector may generate a signal indicative of the charge level of the battery for input into charging logic 11 or this signal may be input into controller 12 depending, for example, on firmware or other instructions. In another embodiment, the charging logic may perform the operation of detecting the charge level of battery 13.

Figure 2:
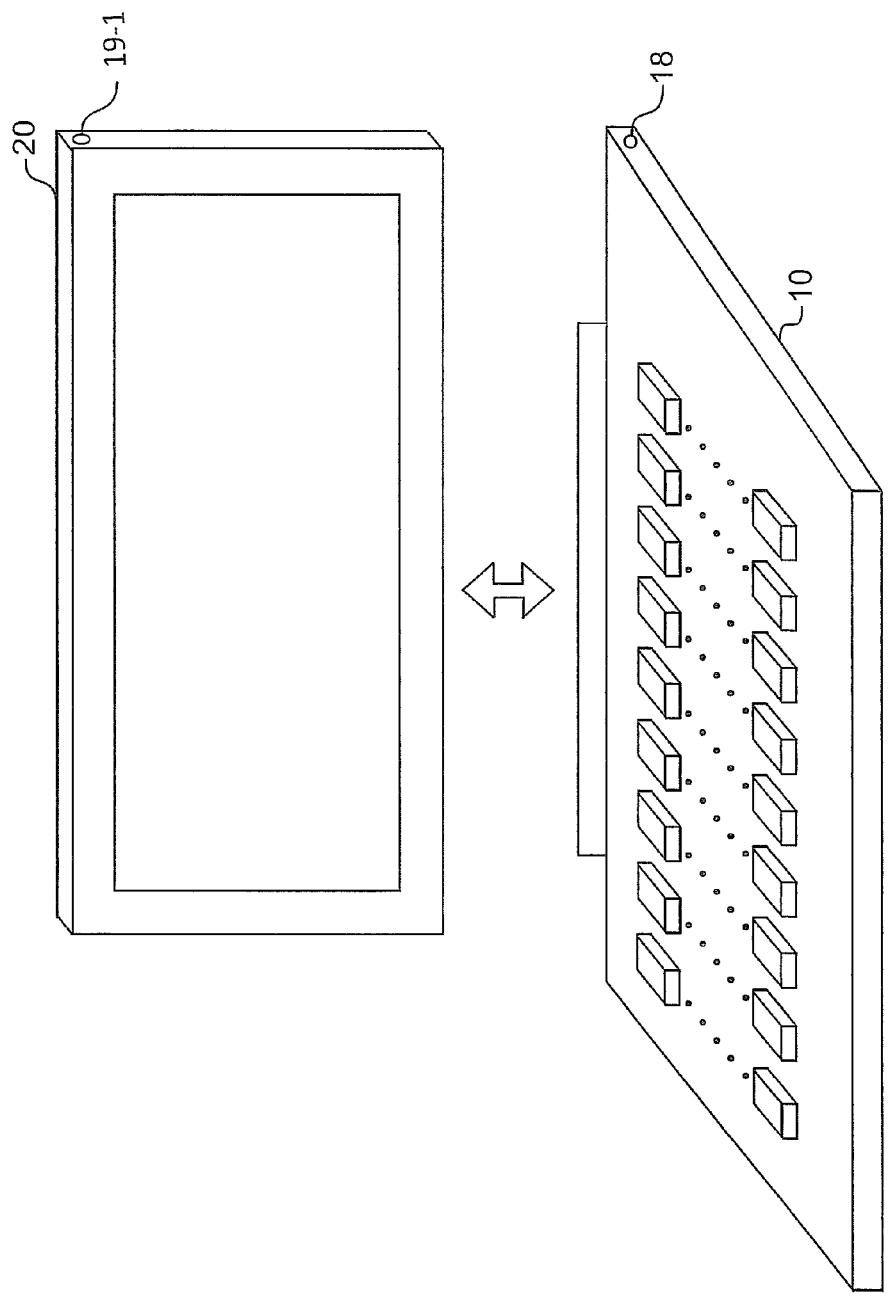
FIG. 2 shows an example application of the power management system.

FIG. 2 shows an example of the first and second devices according to one possible application. In this example, the first device 10 is a base unit and the second device 20 is a detachable tablet. The first device may include a port 18 coupled to the AC adaptor interface 1 and the second device may include a port 19-1 coupled to the AC adaptor interface 15. In addition to the AC adaptor interface, the base may include a keyboard or other input device to allow for data entry and/or use of the functions on the tablet when attached. In other embodiments, the base may serve as a docking station for charging or other purposes.

In this embodiment, the first and second devices are equipped with respective detector circuits 8 and 16 when the first and second devices are electrically connected based on signals from corresponding ones of the interface circuits. When the tablet is detected to be attached to the base, detection signals are sent to controllers 3 and 15 to initiate a first type of power management scheme according to the control software. When the tablet and base are detached, corresponding signals are sent from the detectors to the controllers to initiate a second type of power management scheme. Examples are discussed in greater detail below.

The power management system may correspond to at least the charging logic and controller in either or both of the devices and may operate based on the control software implementing the power management schemes. As will become apparent, additional power management schemes may be performed based on other factors including whether or not AC adaptor power is connected.

In accordance with one embodiment, the type of power management scheme to be employed by the controller(s), charging logic, and/or control software may change based on the performance of a boost operation or a hybrid power operation, or both. The determination on whether these operations may be performed may depend on connection states of the devices to one another and/or to an AC adaptor and/or whether devices 10 and 20 are attached or detached.

Figure 3:
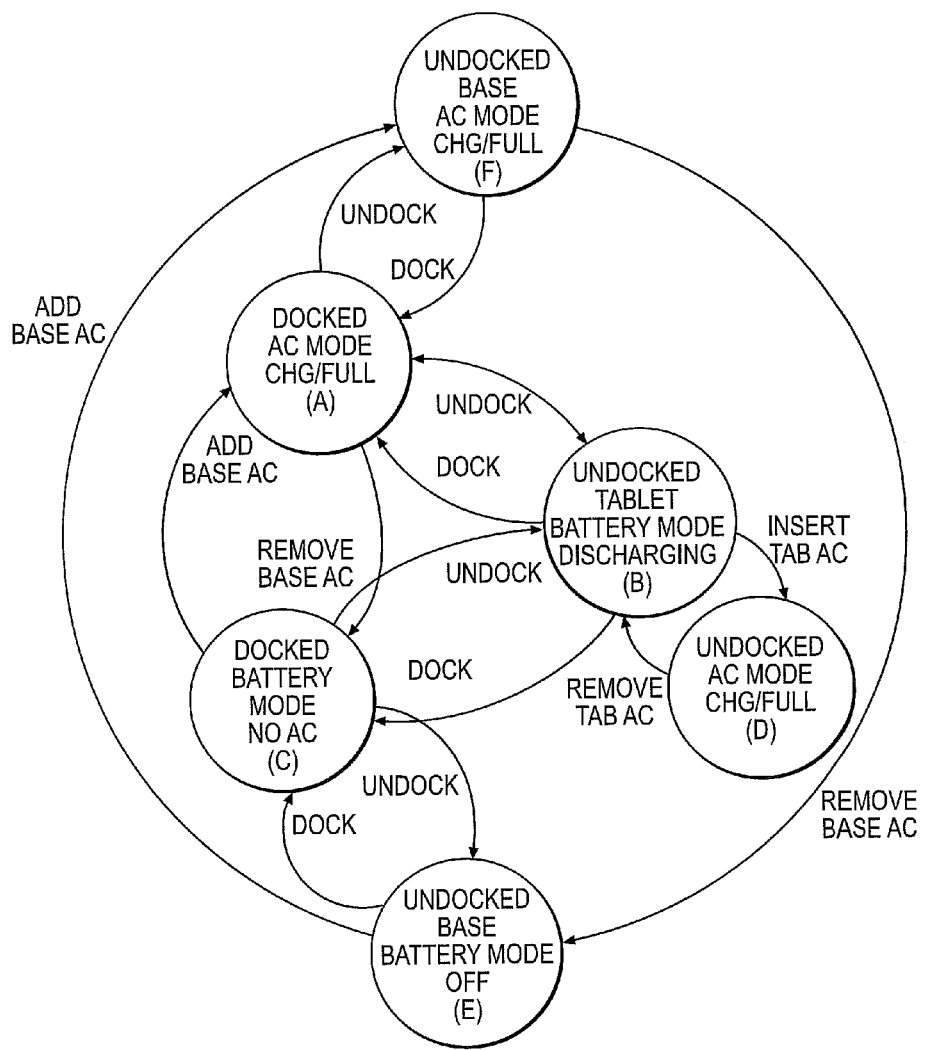
FIG. 3 shows an example of a state diagram to control power management.

FIG. 3 shows a state diagram for power management implemented in one or both of the devices. The six states in the diagram of FIG. 3 are listed below:

| State | Connection State | Power Description of System State |
|---|---|---|
| A | Attached | Tablet and Base Batteries Charged by Power from the Base AC Adaptor |
| B | Detached | Tablet Running on Own Battery Power |
| C | Attached | Tablet Running on Own Battery or Base Battery Power |
| D | Detached | Tablet Battery Charged by Power from Tablet AC Adaptor |
| E | Detached | Base Running on Own Battery Power |
| F | Detached | Base Battery Charged by Power from Base AC Adaptor |

In the list above, the system states may have varying levels of performance management, thermal management and/or power management in addition to battery charging and discharging. For example, in State A, the tablet is docked in AC mode. This may allow a greater amount of performance (fuller and longer duration of turbo) and usability (e.g., more features: base keyboard, USB, HDMI, etc., plus native tablet features) than, for example, State B operation where the tablet is in battery mode.

In the state diagram, six states are shown along with arrows for showing how power management is to change when passing between or among the states. This diagram is explained relative to the base and tablet shown in FIG. 2; however, the state diagram may be applied in whole or part to other devices or scenarios including the case where only one of the devices has a battery. Each of the states will now be explained in greater detail.

State A.

In this state, the tablet is attached to the base and the AC adaptor of the base is plugged in to receive power. The power from the base AC adaptor is used by the charging logic 2 and 11 in the base and tablet to charge respective ones of their batteries. The AC power may also be used to provide power for controlling the operation of the respective devices. For example, if the base has a keyboard, operation of the keyboard may be powered from the base AC adaptor, and any operations of the tablet may also be performed based on this AC power (e.g., the AC power may be transferred to the tablet through interface circuits 4 and 14).

Additionally, or alternatively, the performance of a hybrid power operation, a boost operation, or both, based on available power may be controlled in State A. In accordance with one embodiment, power management in State A may be performed in one or both the tablet and base according to the following sub-states, taking hybrid power and boost operations into consideration.

TABLE 1

State A—Docked, AC, Charge/Full

| OFF|(ON)** Substate | Batt 2-Tablet Cond | Action | Batt 1-Base Cond | Action | Platform TDP |
|---|---|---|---|---|---|
| 1 | Full | Held | <fail safe % | Charge, (No Turbo, No Boost) | Max cTDP Up |
| 2 | | | >fail safe %, <turbo | Charge, (No Turbo, No Boost) | |
| 3 | | | >turbo threshold %, <100% | Charge, (Turbo Boost) | |
| 4 | | | Full | Charge Trickle, (Turbo, Boost) | |
| 5 | Full | Charge Trickle, (Warning) | Fail | Held | |
| 6 | <fail safe % | Charge (No Turbo, No Boost) | Don't Care* | | |
| 7 | >fail safe %, <turbo threshold | | | | |
| 8 | >turbo threshold %, <100% | | | | |
| 9 | Fail | held, (Warning, Shut Down) | Fail | Held | |

In Table 1, the states (e.g., charge) of the batteries of the tablet and base are shown and corresponding actions are shown in each of nine sub-states in State A. In sub-states 1 to 4, the tablet battery is fully charged and no action regarding charging of this battery is performed, e.g., because the charging logic for charging the tablet battery has been disabled to prevent an overcharge condition. However, power management operations relating to hybrid power and boost operations are controlled for the base battery.

In sub-state 1, the charge in the base battery is below a first predetermined (e.g., minimum allowable) level (shown, by example, by, the notation "fail safe %". In accordance with one embodiment, "fail safe" may be understood to refer to a battery condition corresponding when the battery is or is nearly discharged but can still be used for a short period of time as determined, for example, by control software.) When this condition occurs, the system (e.g., controller 12 or another base processor) may prevent certain types of boost and hybrid power operations from being performed that require power to be output from the tablet battery. In this sub-state, the system also performs a charging operation to charge the base battery. The charging operation is performed by charging logic 11 (with or without management from controller 12) based on power from the connected AC adaptor.

Based on control firmware or other code, charging of the tablet battery may be performed based solely on power from the AC adaptor or a hybrid power operation may be performed which involves using power from both the AC adaptor and power received from the tablet battery transferred through interfaces 4 and 14. These functions may be performed by the controller sending control signals to the charging logic or may be performed by the charging logic independently from the controller.

In sub-state 2, charging of the base battery continues until the base battery charge is between the first predetermined level and a second predetermined level, the latter of which corresponds to the notation "Turbo." The Turbo level may be considered to be a charge level above which power from the tablet battery may be used to perform a boost operation. (The word "Turbo" may refer to an Intel Turbo Boost operation or may generically be used refer to another type of boost operation). Because the second predetermined level has not yet been reached, a boost operation is prohibited in sub-state 2 and, also, the use of power from the base battery to perform a hybrid power operation may also be proscribed.

In sub-state 3, charging of the base battery continues until the base battery charge is between the second predetermined level and a third predetermined level, which may correspond to a full charge or a charge less than full charge but greater than the second predetermined level. In this sub-state, boost and hybrid power operations may be performed based on power output from the base battery.

In sub-state 4, a charge trickle operation is performed for the base battery. This operation may involve charging the base battery at a slow rate than in previous sub-states until a full charge is established. The lower charge rate (as controlled by the charging logic) helps to ensure that a maximum capacity charge level of the base battery is not exceeded and therefore serves as a protection mechanism from overcharging, which could damage the battery. Boost and hybrid power operations are available in this sub-state.

In sub-states 5 through 8, charging of the base battery is no longer performed. In Table 1, the notation "fail" may be understood to mean that the battery has stopped functioning, is damaged or is in some way unresponsive or reported to be unusable. This may include the case where the battery is removed. In the example given, priority is given to charging to the tablet battery so the tablet will have the most or at least a sufficient charge if a user suddenly removes the tablet from the base.

If the tablet battery needs charging, charging of the tablet battery may be given priority over charging the base battery. As a result, a "don't care" condition is given as to the base battery state of charge, because the tablet battery will be charged first to completion in one embodiment. (In the example of using the base battery to help charge the tablet battery, a "care" condition would take the charge of the base battery into consideration.) In other embodiments, a different priority, order, or preference may be given.

Between sub-states 5 and 6, the tablet battery may discharged in order to provide power to operate one or more tablet functions, to provide power that is to be combined with the AC adaptor power in performing a hybrid power operation or boost operation, and/or as a result of another condition that results in a loss of charge. In sub-state 6, the tablet battery charge is below the first predetermined level (e.g., fail safe %).

In accordance with one embodiment, the tablet battery is charged in sub-states 6, 7, and 8 up until a full charge is established (unless intervening use of the tablet battery causes the tablet battery charge to fall to a lower sub-state level). During these sub-states, the ability to perform boost and hybrid power operations may be prevented; however, in other embodiments one or both of these operations may be available, for example, in sub-states 7 and 8.

In sub-state 9, if the tablet battery should fail or otherwise function improperly, a warning of may be given and/or the tablet may be shut down or moved to a low power state as a protection feature. In sub-state 9, the base battery is in a "fail" status and all actions concerning discharge of the base battery are held until the battery can resume safe or proper operation.

In Table 1, the notation "max cTDP up" means configurable Thermal Design Power (cTDP) of the CPU. This term may be understood to describe the ability to dynamically configure the level thermal design power of the CPU. Put differently, Max cTDP up may mean maximum turbo and therefore maximum performance may be reached and allowed. In accordance with one example, implementation, State A's priority may be the highest possible performance; however, in other embodiments a different priority or level of performance may be assigned to State A.

The nine sub-states in Table 1 do not have to be performed in succession, but rather power management control can proceed from any one sub-state to any other sub-state in a non-sequential order based, for example, on the charging or discharging state of the battery and/or the operational modes and function of the corresponding devices to be performed.

State B.

In this state, the tablet is detached from the base and is operating based on power supplied by its own battery (e.g., no AC adaptor connected). The power control system may control charging or discharging of the tablet battery, for example, in accordance with the sub-states, control operations and charge ranges set forth in Table 2. Because the base is not attached in this state, any boost operation performed is based on power from the tablet battery and no hybrid power operation is performed because the AC adaptor and the base are not attached. In this mode, long battery life may be become the priority and the system may dynamically configure itself (based, for example, on firmware or other control software) to operation the most efficient or a predetermined mode.

TABLE 2

State B—UnDocked Tablet, Batt Mode, No AC

| OFF (ON)** Substate | Batt 2-Tablet Cond | Action | Batt 1-Base Cond | Action | Platform TDP |
|---|---|---|---|---|---|
| 1 | <fail safe % | Discharge, (Shutdown) | NA | NA | MM cTDP Down |
| 2 | >Fail safe %, <turbo Threshold % | Discharge, (No Turbo, NA Boost) | | | |
| 3 | >turbo threshold %, <100% | Discharge, (Turbo, NA Boost) | | | |
| 4 | Full | | | | |
| 5 | Fail | Held, (Crash!) | | | |

In one embodiment, long battery life and low thermal heat may be given priority for tablet operation. Therefore, cTDP (turbo) may be controlled in such a way as to provide a predetermined lower or lowest energy usage and a predetermined lower or lowest thermal heat generation. In other embodiments, this priority may be different.

State C.

In this state, the tablet is attached to the base and is operating based on power from the tablet battery (e.g., no AC adaptor connected to the tablet). The power control system may control discharging of the tablet battery, for example, in accordance with the sub-states, control operations and charge ranges set forth in Table 3. Because the base is attached in this state, a boost operation may be performed and is based on power from the base and a hybrid power operation may be performed based on (e.g., by combining) power from the tablet battery and power from the base. The power from the base may derive from the base battery and/or an AC adaptor connected to the base.

In sub-state 3, the base battery charge corresponds to the third predetermined threshold (e.g., full) and a boost operation may be performed but not a hybrid power operation.

In sub-states 4, 5, and 6, the tablet battery charge is within different ranges (as shown) and is discharged to support functions of the tablet. Boost and hybrid power operations may not be performed based on AC power because the AC adaptor is not connected to the tablet. However, in one embodiment, a hybrid power operation may be performed based on tablet battery power and power from the base. A boost operation may also be performed based on the hybrid power in at least sub-states 5 and 6.

Also in sub-states 4 to 6, base battery charge is below the first predetermined level, e.g., below fail safe %, and no action is performed using power from the base battery.

In sub-states 7 to 9, the tablet and battery charges are below the first predetermined level (e.g., fail safe %) or at fail and warning and/or shutdown operations are performed.

TABLE 3

State C—Docked Batt Mode, No AC

| OFF(ON)** Substate | Batt 2-Tablet Cond | Action | Batt 1-Base Cond | Action | Platform TDP |
|---|---|---|---|---|---|
| 1 | Don't Care | Held | >fail safe %, <turbo Threshold % | Discharge, (No Turbo, NA Boost) | Bes: Bestlife vs Perf Usage cTDP |
| 2 | | | >turbo threshold %, <100% | Discharge, (Turbo, NA Boost) | |
| 3 | | | Full | | |
| 4 | >fail safe %, <turbo threshold % | Discharge, (No Turbo, NA Boost) | <fail safe % | Held | |
| 5 | >turbo threshold %, <100% | | | | |
| 6 | Full | | | | |
| 7 | <fail safe % | Discharge, (shutdown) | <fail safe % | Held | |
| 8 | Fail | Held | <fail safe % | Discharge, (Warning, Shutdown) | |
| 9 | <fail safe % | Discharge, shutdown | Fail | Held | |
| 10 | >fail safe %, <turbo threshold | Discharge, (No Turbo, NA Boost) | | | |
| 11 | >turbo threshold %, <100% | Discharge, (Turbo, NA Boost) | | | |
| 12 | Full | | | | |
| 13 | Fail | Held (Crash!) | | | |

In sub-state 1, the base battery charge is between first and second predetermined thresholds (as shown) and the battery discharges to support functions of the base (e.g., if the base has a keyboard, operation of the keyboard). No boost or hybrid power operations are performed.

In sub-state 2, the base battery is charged between second and third predetermined thresholds (as shown) and is discharged to support base functions. In this sub-state, a boost operation may be performed but a hybrid power operation may not be performed.

In sub-states 10 and 11, the tablet battery is in various ranges (as shown), discharge operations are performed, and a hybrid power operation is not available based on power from the tablet AC adaptor (because it is not connected) and no boost operation based on tablet AC power is available. However, boost and/or hybrid power operations may be performed based on tablet battery power and power received from the base.

In sub-state 12, the tablet battery is full, discharge continues, and a boost operation may be performed but not a hybrid power operation (at least based on power from the tablet AC adaptor because this adaptor is not connected in State C).

In sub-state 13, the tablet battery crashes and no action is performed based on tablet battery power. In sub-states 10 to 13, the base battery is in a fail state because of a very low remaining charge and no action is performed based on base battery power.

In Table 3, the notation "Best Battery Life vs. Perf Usage cTDP" may indicate a preference. For example, in sub-states where turbo is not allowed, the system will configure itself (based on firmware, etc.) in such a way as to provide a predetermined lower or lowest energy usage and a predetermined lower or lowest thermal heat generation to optimize for improved or best battery run-time.

In sub-states where turbo is allowed but boost is not, the system may configure itself to allow enough turbo (performance) as possible without exceeding the capabilities of the battery or batteries. But, because if AC adaptor is not present, hybrid power boost may not possible based on adaptor power in order to provide power for reaching the highest levels of turbo. Therefore, performance might be better than state B (tablet) but less than state A (docked with AC power).

State D.

In this state, the tablet is detached from the base and is operating based on power from the AC adaptor of the tablet. This power may power functions of the tablet and also, in certain circumstances, simultaneously be used to charge the tablet battery. The power control system may control charging of the tablet battery, for example, in accordance with the sub-states, control operations and charge ranges set forth in Table 4. Because the tablet is detached from the base in State D, any boost and/or hybrid operation performed is based on power from the tablet battery and/or tablet AC adaptor.

In sub-state 4, the tablet battery charge is at the third predetermined level and a charge trickle operation may or may not be performed. Boost and hybrid power operations, or both at the same time, are available. And, in sub-state 5, the battery is in a fail state with an attendant warning operation being performed.

In State D, the notation "Best Battery Life vs. Perf Usage cTDP" may be understood to correspond to a preference. For example, performance within a proper thermal heat range (e.g., tablet case temperatures) may be given priority. In such a case, the AC power may be allow for the highest boost and turbo, but this may be balanced within a low thermal heat envelope. Therefore, in accordance with one embodiment, cTDP (turbo) may be controlled in such a way as to provide a predetermined or best boost and performance within an allowed thermal envelop.

State E.

In this state, the tablet is detached from the base and the base does not have its AC adaptor connected. Also, the base battery may not be actively managed in this state, as shown in Table 5.

TABLE 5

| | | State E—UnDocked Base, Batt, No AC | | |
|---|---|---|---|---|
| OFF Substate | Batt 2-Tablet Cond | Action | Batt 1-Base Cond | Action | Platform TDP |
| 1 | NA | NA | <fail safe %, | Held | NA |
| 2 | | | >fail safe %, <turbo threshold % | | |
| 3 | | | >turbo threshold %, <100% | | |
| 4 | | | Full | | |
| 5 | | | Fail | | |

TABLE 4

| | | State D—UnDocked Tablet, AC, Charge Full | | | |
|---|---|---|---|---|---|
| OFF (ON)** Substate | Batt 2-Tablet Cond | Action | Batt 1-Base Cond | Action | Platform TDP |
| 1 | <fail safe % | Charge, (No Turbo, No Boost) | NA | NA | Bes: Bestlife vs. Perf Usage cTDP |
| 2 | >fail safe N, <turbo threshold % | Charge, (No Turbo, No Boost) | | | |
| 3 | >turbo threshold %, <100% | Charge Trickle, (Turbo, Boost) | | | |
| 4 | Full | Charge Trickle, (Turbo, Boost) | | | |
| 5 | Fail | Held, (Warning) | | | |

In sub-state 1, the tablet battery charge is below a first predetermined level (e.g., fail safe %) and is being charged based on power from the tablet AC adaptor. Because of inadequate charge in the tablet battery and because the tablet is detached from the base, no boost or hybrid power operations are available in this sub-state.

In sub-state 2, the tablet battery charge is between the first predetermined level and a second predetermined level (e.g., boost power threshold level, illustratively referred to as "turbo threshold %"). In this range, the tablet battery is charged and boost or hybrid power operations may not be performed.

In sub-state 3, the tablet battery charge is between the second predetermined level and a third predetermined level (e.g., full (100%) charge). The charge is performed based on a charge trickle operation and a boost operation may be performed. Also, a hybrid power operation may be performed, with the boost operation or separately, by combining power from the tablet power and tablet AC adaptor power.

State F.

In this state, the tablet is detached from the base and power from the base AC adaptor is used to charge the base battery. In this state, the base battery is charged based on power from the base AC adaptor in all sub-states but the last sub-state. In the last sub-state, no operations are performed based on base battery power because the base battery is in a fail state.

TABLE 6

State F—UnDocked Base, Batt, With AC on Base

| OFF Substate | Batt 2-Tablet Cond | Action | Batt 1-Base Cond | Action | Platform TDP |
|---|---|---|---|---|---|
| 1 | NA | NA | <fail safe % | Charge | NA |
| 2 | | | >fail safe %, <turbo threshold % | | |
| 3 | | | >turbo threshold %, <100% | | |
| 4 | | | Full | | |
| 5 | | | Fail | Held | |

In each state of operation A through F, as previously indicated the sub-states are not necessarily sequential performed but rather are used to define operation in accordance with at least one embodiment as a result of being entered discretely or non-successively.

Also, power in one or both of the tablet and base is controlled from going from one state to another as shown by the arrows in the state diagram of FIG. 3. Transfer of one state to another is performed based on one or more predetermined conditions. According to one embodiment, as indicated in the foregoing charts, the predetermined condition(s) may include changing between attached or detached states of the tablet relative to the base and/or whether or not an AC adaptor is connected. Battery charge may be determined based on signals from respective ones of the detectors in the tablet and/or base. The signals from the detectors may be interpreted by firmware code.

In accordance with one embodiment, the actions in each state and sub-state may be performed based on control signals from the controller in one or more of the tablet or base and/or functions performed by the charging logic as determined, for example, by firmware or other code stored in memory used to implement the power management system.

In accordance with one embodiment, the control signals may control switching between or among any combination of the tablet and base batteries and AC adaptors along with performing control of charging and discharging operations. In addition to performing power management, the firmware code may perform other tasks including but not limited to thermal control and managing or adjusting power to different platforms within the device, as well as other system management functions.

By implementing state transitions and their attendant functions in the diagram of FIG. 3, the power management system is able to manage power in one or both the tablet and base. According to one embodiment, the power management may be performed by giving priority to charging or preserving power in the battery of one of the devices. Because the tablet is likely to be used more than the base, priority to the tablet battery may be programmed into the operation of the controller and/or charging logic.

Once a state transition has been performed, the power management system may further control power management based on the sub-states listed in a relevant one of the charts listed above. By managing power in this manner, battery power may be preserved or charged to increase the usefulness of the tablet. These sub-states may also set turbo power limits based on battery charge and/or AC adaptor power capacity for performing a central processing unit (CPU) turbo boost.

As previously indicated, boost and hybrid power operations may correspond to one or both of the Turbo Boost and Hybrid Power Boost technologies provided by Intel corporation. When implementing Turbo Boost, the controller of a device may cause the CPU (or other processor) to operate above its base operating frequency based on dynamic control of the CPU's clock rate. For example, this clock rate may be increased to greater levels based on certain (e.g., thermal) limits or other constraints.

When implementing a Hybrid Power Boost, the controller of one or both of the tablet and base use both AC adaptor power and battery power to control or support operation of the device, while if possible at the same time using the AC power to charge the battery of one or both devices.

Figure 4:
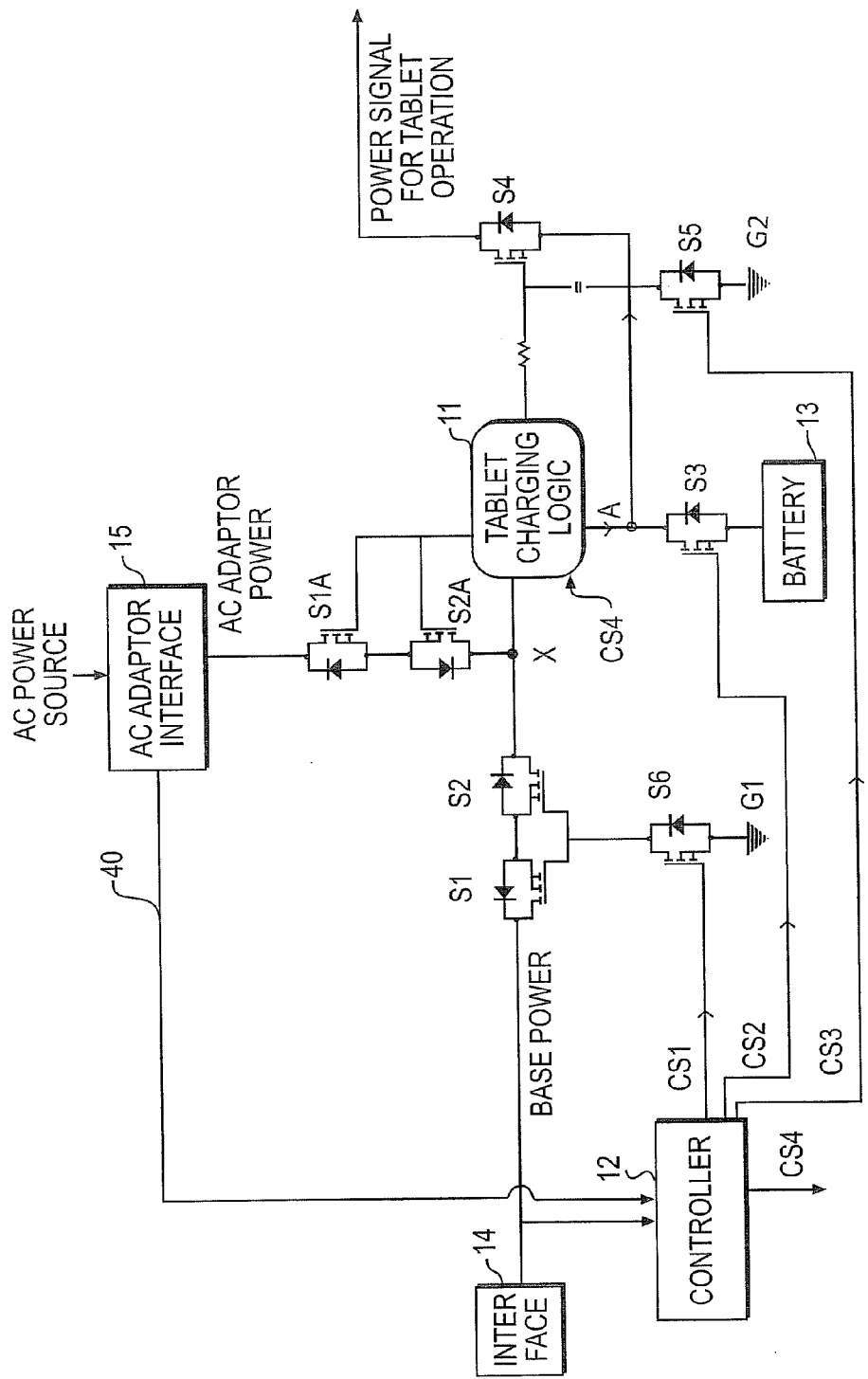
FIG. 4 shows one embodiment of a power management system for a tablet.

FIG. 4 shows one embodiment of a power management system for a tablet. The tablet may be one configured such as shown in FIG. 2 or another tablet. In other embodiments, the system of FIG. 4 may be used in electronic devices different from a tablet.

When applied to the tablet of FIG. 2, the power management system includes charging logic 11, controller 12, battery 13, interface circuit 14, and AC adaptor interface 15. In operation, the controller generates a number of control signals to manage power and charging in the tablet when the tablet is attached to the base, when the tablet is detached from the base, and based on whether the AC adaptor of the tablet is connected.

When the tablet is attached to the base, interface circuit 14 may receive power from the base in one of two circumstances. The first circumstance corresponds to when power from the base comes from the base battery and the second circumstance corresponds to when power from the base comes from the base AC adaptor. In accordance with one embodiment, the tablet circuitry may not discriminate between either circumstance for purposes of managing power in the tablet and charging the tablet battery.

When power is received from the base through interface circuit 14, controller 12 detects this power (e.g., as a result of a voltage increasing above a threshold level) and issues a number of control signals in response. A first control signal (CS1) has a logical one value which turns on n-type metal-oxide-semiconductor field effect transistor (MOSFET) S6. Turning on this transistor causes the base terminals of p-type transistors S1 and S2 to be coupled to a logical zero value corresponding to ground terminal G1. This logical zero value turns on transistors S1 and S2, which allows power from the base to be input into charging logic 11 of the tablet.

A second control signal (CS2) may have a logical zero value to turn on p-type transistor S3 at this time. Turning on this transistor will allow the tablet charging logic 11 to use the base power received through transistors S1 and S2 to charge the tablet battery 13. If the tablet battery is already charged to full capacity (as determined by a detection circuit or charging logic), then control signal CS2 may transition to a logical one value to turn off transistor S3 to stop the tablet battery charging process.

A third control signal (CS3) may have a logical zero value to turn off n-type transistor S5 at this time. Turning off this transistor will prevent shorting out n-type transistor S4 which controls the output of a power signal for powering internal circuits of the tablet. When transistor S5 is off, the output of the charging circuit may control the state of transistor S4. If no base power is being received (and the AC adaptor is not connected), then the output of the charging circuit may correspond to a logical zero and no power signal may be generated for the internal circuits of the tablet through S4.

If base power is received, the output of the charging circuit may qualify as a logical one value to turn on transistor S4. When this occurs the output of the charging logic may generate a power signal for powering internal circuits of the tablet. The base power may be divided at Node A for purposes of charging the tablet battery and generating the power signal for the tablet.

The logical value of CS3 may be different in other embodiments. For example, in the event the tablet is not being used while attached to the base or the user merely intends to charge the tablet batteries using base power, the controller may generate CS3 to have a logical one value to on transistor S5. Turning on this transistor couples a logical zero value (by virtue of ground G2) to the base of transistor S4 to turn off S4. As a result, all the base power through Node A is used to charge the tablet battery.

When power is received from the AC adaptor interface 15 of the tablet, controller 12 receives a detection signal from the interface through signal line 40. After this detection signal is received, the controller may output a control signal (CS4) to the tablet charging logic 11, to cause the charging logic to output a signal having a logical one value to n-type transistors S1a and S2a. As a result, transistors S1a and S2a are turned on to allow AC power to be input into the charging logic through interface 15.

At this time, the controller may generate a variety of control signals, for example, based on control firmware. When the tablet is attached to the base, the controller may generate CS1 to have a logical one value to couple the base of transistors S1 and S2 to ground G1. This will allow power from the base to be combined with power from the AC adaptor to perform a hybrid power operation, e.g., power from the base and tablet AC adaptor are combined at Node X and input into charging logic 11. CS2 may have a logical zero value and CS3 may have a logical zero or one.

The combined power may be used to provide additional power for supporting a boost operation managed by controller 12 or another processor (e.g., a central processing unit (CPU) in the event controller 12 is not a CPU of the tablet). The charging logic may output the combined power through Node A and transistor S4 to form the power signal. The boost operation may be performed based on the states and substates and their charge ranges and conditions previously discussed. In another embodiment, the power signal is used to control functions of the tablet different from a boost operation, which functions may or may not be initiated by a user.

Additionally, or alternatively, the power combined at Node X may be output from the charging logic through Node A to be used to charge the tablet battery. If all the combined power is to be used to charge the battery, then transistor S4 may be deactivated at this time. If a portion of the combined power is to be used to charge the battery while another portion is to be used in generating the power signal, then the power output from the charging logic may be divided at Node A in proportion to load or draw requirements.

If the tablet battery is fully charged or charged above a predetermined level, then in another embodiment power from the base, AC adaptor 15, and tablet battery may be combined at Node A to provide power necessary to support a boost operation or other use of the power signal output from the tablet.

Under a different set of circumstances, the controller may generate CS1 to have a logical zero value (when the tablet AC adaptor and base are connected) to prevent power from the base from reaching charging logic 11. This will allow the AC power through interface 15 to charge the tablet battery and/or power internal circuits of the tablet to allow the tablet to be used by a user or to otherwise function with the base. CS2 and CS3 may have logical zero values at this time. When the battery 13 becomes fully charged, CS2 may then have a logical one value to protect the battery from damage.

When the tablet is not attached to the base, the controller may generate CS1, CS2, and CS3 to have logical zero values. This will allow the charging logic to charge the battery based on AC power through interface 15. Based on one or more conditions (e.g., the level of charge in the tablet battery) some of that power may also be used to generate the power signal for allowing a user to operate the tablet. In FIG. 4, the AC adaptor interface 15 is shown to output a detection signal to controller 12. In another embodiment, the detection signal from the AC adaptor interface may be input directly into the tablet charging logic, to alleviate the need to generate control signal CS4 from the controller.

Figure 5:
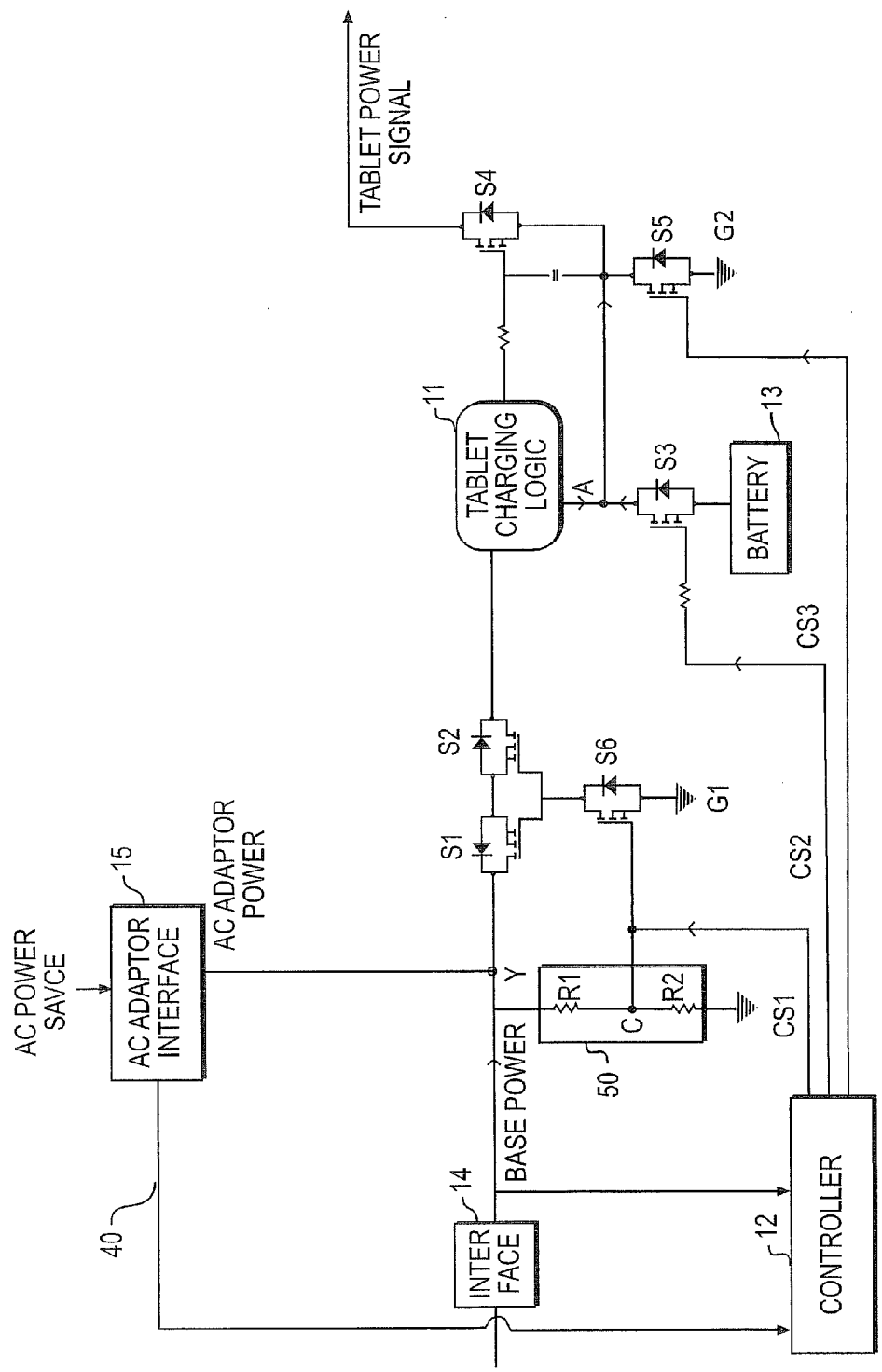
FIG. 5 shows another embodiment of a power management system for a tablet.

FIG. 5 shows another embodiment of a power management system for a tablet. This system differs from the system in FIG. 4 at least by the omission of transistors S1a and S2a and the inclusion of a divider circuit 50.

More specifically, in the embodiment of FIG. 5, AC adaptor interface 15 is coupled to the tablet charging logic 11 through transistors S1 and S2. Thus, the base power and AC power from the tablet adaptor pass through (and when a hybrid power is performed combined at) a same node (Node Y) set in advance of transistors S1 and S2. In addition, the divider circuit 50 (formed from or including resistors R1 and R2) is coupled between interface circuit 14 for receiving power from the base and transistor S6. As a result of these features, the output of the divider circuit (from Node C) may control the state of transistor S6, in addition to control signal CS1 from controller 12. In one embodiment, the divider may allow switches S1 and S2 to turn on when the tablet is docked and the tablet battery is fully discharged and the tablet controller is not powered on.

In operation, when the tablet is attached to the base and the AC adaptor is not connected to interface 15, a voltage signal based on the base power passes through the voltage divider. The value of R1 may be selected so that the voltage at Node C (taking the base voltage into consideration) corresponds to a logical one value. In this case, when the tablet is attached, the logical one value output from the divider circuit turns transistors S6 on. As a result, the base terminals of p-type transistors S1 and S2 are coupled to ground G1 and therefore turn on to allow the base power to pass to the tablet charging circuit. This charging circuit then charges the tablet battery and/or is used to generate the power signal for operating internal circuits and functions of the tablet as described relative to FIG. 4.

In this situation, the controller may or may not issue control signal CS1 because the state of transistor S6 (and consequently whether or not base power passes to the charging logic through S1 and S2) is controlled by the voltage divider.

When the tablet is attached and adaptor interface 15 receives AC power, the AC and base power may flow to the charging logic through transistors S1 and S2 and the charging logic may control charging of the battery and/or output of a tablet power signal based on both received powers. This situation may arise, for example, during a hybrid power operation performed with or without a boost operation. In accordance with one embodiment, a feedback circuit may be provided to block power from reaching the charging logic from either the AC Adaptor or the base in this circumstance. The feedback circuit function may be performed by the controller 12 or a separately provided circuit.

When the tablet is not connected to the base and the AC adaptor power is received, the input of the divider circuit 50 is zero or at least the voltage at node C corresponds to a logical zero value. As a result, the base terminals of transistors S1 and S2 are left floating at voltages that correspond to a logical zero value. As a result, transistors S1 and S2 turn on and power from the AC adaptor interface passes to the charging logic for charging the battery and/or generating a tablet power signal.

Figure 6:
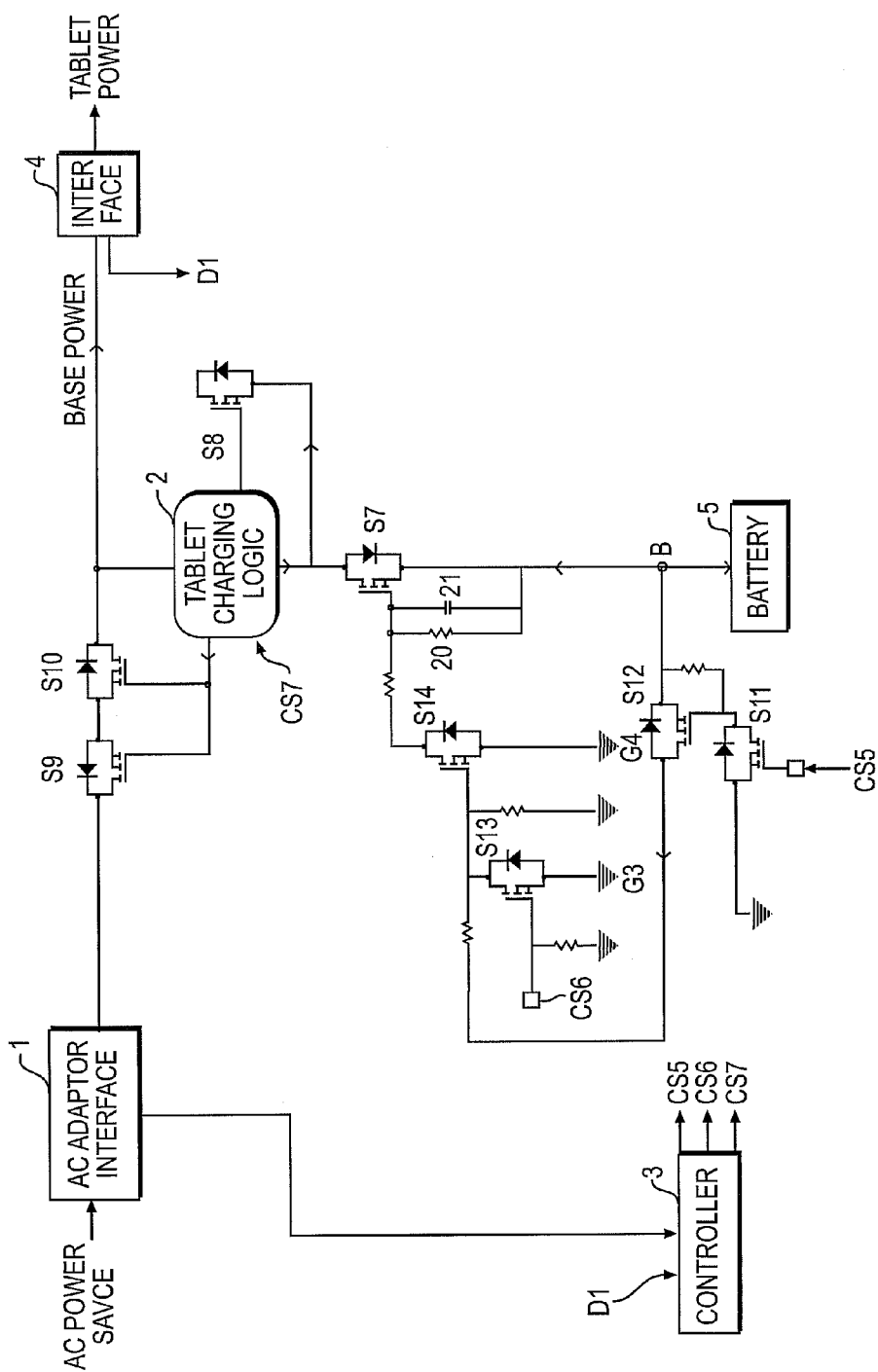
FIG. 6 shows one embodiment of a power management system for a base.

FIG. 6 shows one embodiment of a power management system for a base. The base may be one configured such as shown in FIG. 2 or may correspond to a different kind of base. In other embodiments, the power management system of FIG. 5 may be used in electronic devices different from a tablet base.

When applied to the base of FIG. 2, the power management system includes AC adaptor interface 1, charging logic 2, controller 3, interface circuit 4, and battery 5. In operation, the controller generates a number of control signals to manage charging in the base battery and output of power to the tablet when the tablet is attached to the base based on whether the AC adaptor of the tablet is connected.

When the tablet is attached to the base, the controller issues control signals for outputting power from the base to the tablet through interface circuit 4. The power may be output from the base battery or from the AC power adaptor of the base, based on whether the base AC adaptor is connected.

When the AC adaptor is not connected, power to the tablet is provided from the base battery. To provide power from the base battery, first, the controller detects a connection between the base and tablet, for example, based on the output of detection signal D1 from interface 4. After the D1 signal is received, the controller generates a control signal (CS5) to have a logical zero value to turn off n-type transistor S11. Turning off this transistor allows the output of battery 5 to control operation of p-type transistor S12. The output of battery 5 has a logical one value, which turns off transistor S12 to thereby electrically isolate the battery from the circuit of transistors S13 and S14.

At this time, the controller may generate a control signal (CS6) having a logical one value to turn on n-type transistor S13. Turning on this transistor causes the base of n-type transistor S14 to be coupled to ground G3. As a result, transistor S14 is turned off, which allows power from battery 5 to travel upward toward n-type transistor S7. Because transistor S14 is turned off, the power from battery is allowed to flow through the R-C network formed by resistor 20 and capacitor 21 to set the input into transistors S7 to a logical one value. This value turns on transistor S7 to thereby allow power from battery 5 to flow to n-type transistor S8.

When the base is not connected to the AC power adaptor, controller 3 may generate a control signal (CS7) to cause the base charging logic to output a logical one value to the base of transistor S8. This turns on transistor S8 and allows the power from battery 5 to flow through interface circuit 4 for powering and/or charging the battery of the tablet.

When the AC adaptor is connected to the base, controller 3 detects this connection based on a signal output from AC adaptor interface 1. The controller then generates CS7 to cause charging logic 2 to output a logical one value to turn on n-type transistors S9 and S10. As a result, power from the AC adaptor interface is allowed to flow to the tablet through interface 4.

At this time, the firmware (or other code or instructions) of the controller may give priority to the AC power over battery power for purposes of powering and/or charging the tablet. When such priority is given, controller 3 may generate CS5 to have a logical one value to turn on transistor S11. Turning on this transistor, couples the base of transistor S12 to ground. As a result, transistors 12 turns on and allows some of the power to flow from battery 5 through node B to towards transistors S14. At this time, controller 3 generates CS6 to have a logical zero value to turn off transistor S13.

As a result, transistor S14 is turned on (based on the battery power passing through transistors S12), which connects the base of transistor S7 to ground G4. This connection shorts out resistor 20 and capacitor 21 from the base of transistor S7 and transistor S7 is turned off, thereby preventing power from battery 5 from passing to transistor S8 and interface circuit 4. As a result, the only power passing through interface circuit 4 is from the AC adaptor of the base. As a precaution, CS7 may be given a logical zero value under these circumstances to shut off transistor S8.

When the tablet is not connected to the base and the AC adaptor is connected, the controller may generate CS7 to cause the charging logic to turn off transistor S8 and to turn on transistors S9 and S10. CS6 has a logical one value to couple the base of transistors S14 to ground, turning off this transistor. Turning off this transistor causes transistor S7 to be turned on, thereby establishing a charging path from the base charging logic (which receives power from the AC adaptor interface) to the battery to charge the battery of the base. The remaining circuit elements shown in FIG. 5 (not numbered) may be considered optional in some cases.

Figure 7:
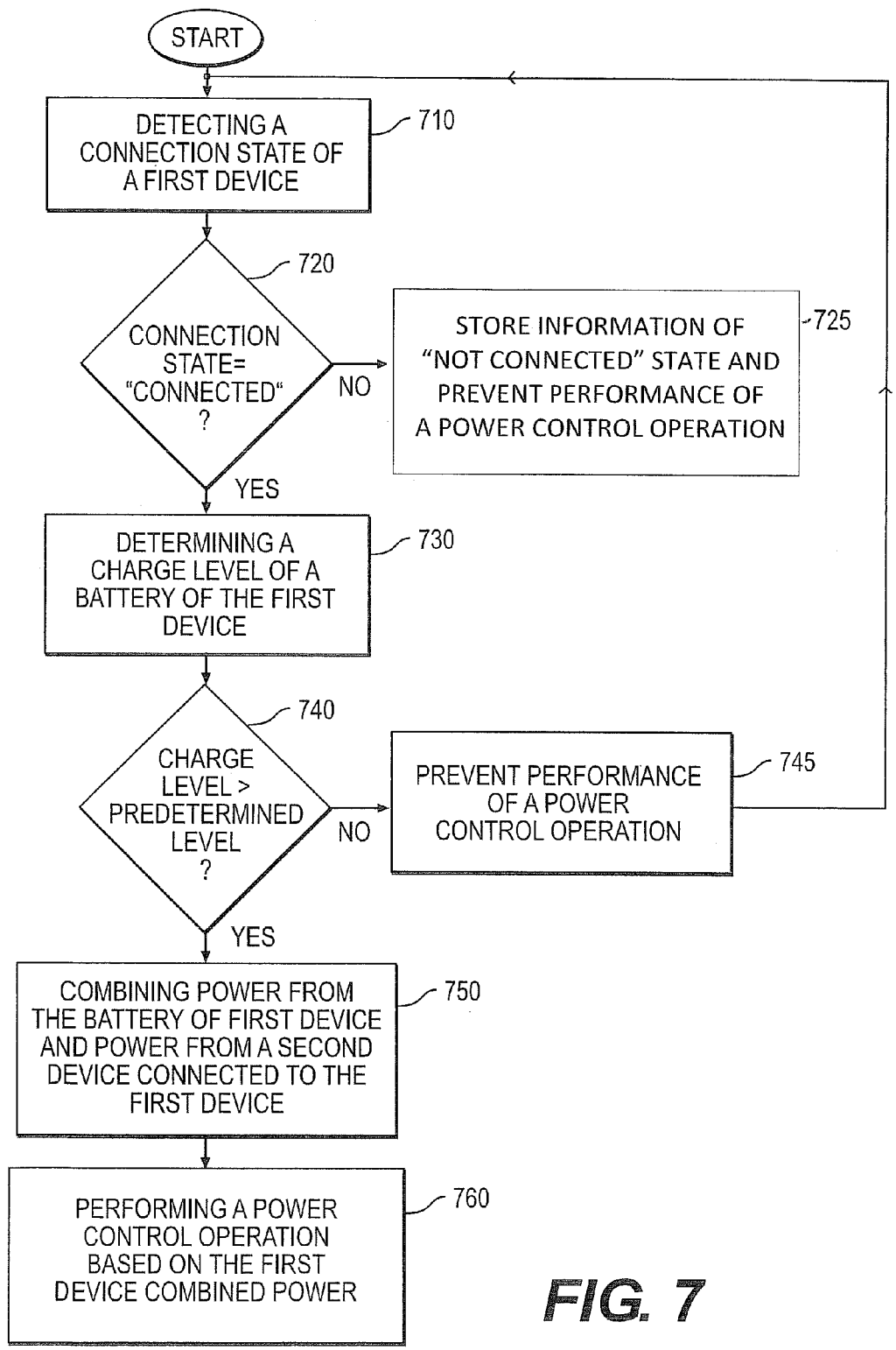
FIG. 7 shows operations in one embodiment of a power management method.

FIG. 7 shows operations included in one embodiment of a method for managing power in an electronic device. The electronic device may be one connected to another device such as discussed in the foregoing embodiments, or the method may be applied in another context or set of devices for performing power management.

In Block 710, an initial operation includes detecting a connection state of a first device. The first device may be, for example, a tablet and the connection state to be detected is whether or not the tablet is connected to a second device, e.g. a base a previously discussed. Alternatively, the connection state may be whether the tablet is connected to an AC power source. In other embodiments, two connection states are determined relative to the second device and AC adaptor.

In Block 720, a determination is made as to whether the detected connection state is a connected state or a not connected state, e.g., whether or not the tablet is connected to the base. If the connection state is "not connected," then information indicative of this state may be stored in the first device and the first device may continue operation without power from a device corresponding to the detected connection state. (Block 725). This may involve, for example, preventing performance of a specific power control operation, which, for example, may be one of a hybrid power operation or a boost operation. Other types of power control operations (e.g., reduce to a lower power state), however, may be performed when the first device is not connected. If the connection state is "connected," then the method may proceed to Block 730.

In Block 730, a determination is made as to the charge level of a battery of the first device. If the charge level of the battery is less than a predetermined level, performance of the specific power operation based on the battery may be prevented under these circumstances, at least until the charge level exceeds the predetermined charge level. (Block 745). Control may then return to the operation in Block 710.

If the charging level of the battery is greater than the predetermined level, the operation in Block 750 may be performed. The predetermined level may correspond, for example, to any of the predetermined levels described in Tables 1 to 6 which correspond to a range for allowing a power operation (e.g., hybrid or boost) to be performed.

At Block 750, power from the battery of the first device is combined with power from a second device connected to the first device, as indicated, for example, by the connection state detected in Block 710.

At Block 760, the combined power is used as a basis for performing the specific power control operation. This may involve using the combined power to support a boost operation for hybrid power and/or for performing a hybrid power operation for otherwise generating a power signal for controlling one or more functions of the first device.

The power control operations mentioned in Blocks 725, 745, and 760 may be the same or different power control operation, or the operations referred to in any two of these operations may be the same. Also, the order of the operations, or blocks, shown in FIG. 7 may be different. For example, Blocks 730, 740, and 745 may be performed or concurrently with Blocks 710, 720, and 725.

Figure 8:
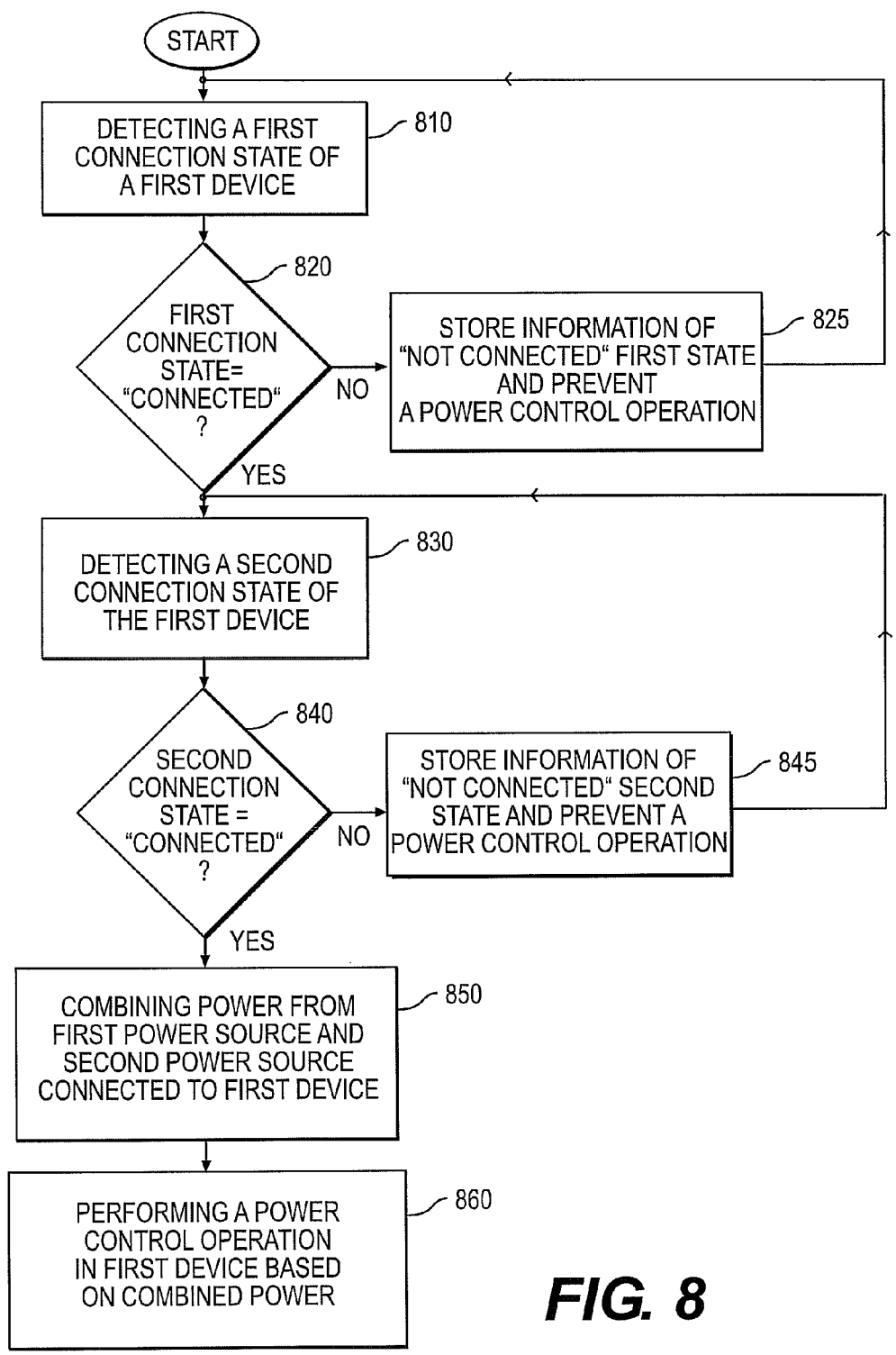
FIG. 8 shows operations in another embodiment of a power management method.

FIG. 8 shows operations included in another embodiment of a method for controlling power in a first device. The first device may be the same or different from the devices discussed in previous embodiments. In Block 810, an initial operation may include detecting a first connection state of a first device. The first connection state may correspond to whether a second device is connected to the first device, e.g., whether a base is connected to a tablet.

A determination is then made as to whether the first connection state is connected or not. (Block 820). If the first connection state is "not connected," then information indicating this state may be stored in the first device and a power control operation based on the first connection state may be prevented. (Block 825). If the first connection state is "connected" (e.g., a second device is connected or otherwise coupled to the first device), the method proceeds to Block 830.

In Block 830, an operation is performed which includes detecting a second connection state of the first device. The second connection state may correspond to whether an AC adaptor or a different type of device is connected to the first device.

In Block 840, a determination is made as to whether the second connection state is "connected" or "not connected." If the second connection state is "not connected," then information indicating this state may be stored in the first device and a power control operation based on this state may be prevented. (Block 845). The method may then proceed to Block 830.

In Block 850, if the second connection state is "connected," then power from a first power source may be combined with power from a second power source. The first power source may correspond to or otherwise be based on the first connected state and the second power source may correspond to or otherwise be based on the second connected state. In accordance with one example, the first device may be a tablet, the first power source may correspond to a battery or AC adaptor power received from a base connected to the tablet, and the second power source may correspond to an AC adaptor connected to the first device.

In Block 860, the combined power may be used as a basis for performing a power control operation in the first device, which, for example, may be a boost operation, a hybrid power operation, both, or another type of power control operation. The power control operations mentioned in Blocks 825, 845, and 860 may be the same or different, and the blocks shown in FIG. 8 may be performed in a different order. For example, the operations in Blocks 830, 840, and 845 may be performed before Blocks 810, 820, and 825.

In another embodiment, power from three power sources may be combined to perform a power control operation. The three power sources may correspond to a battery or AC adaptor of a base, an AC adaptor of the tablet, and a battery of the tablet.

In other embodiments, one or more connection states of the first device may be detected for purposes of controlling a charging operation of the tablet battery. For example, if one or more of the base or AC adaptor of the tablet is connected, then this power or a combination of this power may be used for charging the battery of the tablet. The combined power may be used exclusively for charging the tablet battery under these circumstances, or a portion of the combined power may be used for this purpose with another portion used to generate a power signal for performing one or more functions of the tablet.

Another embodiment corresponds to a computer-readable medium storing a program or instructions for performing any of the embodiments of the methods described herein and/or the firmware or other software for controlling any of the functions performed by the embodiments of the system or other apparatus described herein. The computer-readable medium may be an internal memory of one or both devices to be connected. Examples include an internal read only memory, flash memory, or other storage area capable of storing instructions for implementation by a controller or processor.

According to one or more embodiments, battery charging and/or discharging is managed along with system (e.g., tablet, base, or both) performance and thermals for various usage states (e.g., performance or battery life or a ratio of both). Some embodiments focus on the charging mechanisms of the battery and may regard turbo boost of the CPU as an on/off type description. In other embodiments, configurable TDP (cTDP), or turbo boost, can have varying levels of performance increase and these performance levels may be controlled to give a user the best experience possible for the respective device mode: from greatest performance (docked running on AC) to greatest battery life (tablet on battery mode) and the states in between (docked on battery mode where the performance/battery life can be made workload dependent).

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be performed in an alternative order, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising:
a storage area to store instructions; and
a controller to control power in a first device based on the instructions,
wherein the controller to determine a first connection state of the first device and to determine a second connection state of the first device,
the controller to generate one or more first control signals based on the determined first connection state, and the controller to generate one or more second control signals based on the determined second connection state, the one or more first control signals to control one or more first switch devices and the one or more second control signals to control one or more second switch devices to combine power from a first power source and a second power source for a hybrid power operation;
wherein the first connection state of the first device is based on whether a second device is coupled to the first device;
wherein: the first device comprises a tablet, the tablet including the controller to generate the one or more first control signals to control the one or more first switch devices on the tablet, and the second device comprises a base removably coupled to the tablet;
and wherein the second connection state to be based on coupling of an AC adaptor to the first device.

2. The apparatus of claim 1, wherein the first power source and the second power source are external power sources to be removably coupled to the first device.

3. The apparatus of claim 1, wherein the first power source comprises a battery of the first device and the second power source is located in a second device coupled to the first device, the second device being external to the first device.

4. The apparatus of claim 3, wherein the second power source comprises a battery of the second device.

5. The apparatus of claim 3, wherein the second power source comprises an alternating current (AC) adaptor of the second device.

6. The apparatus of claim 1, wherein the first power source comprises a battery of the first device and the second power source comprises an AC adaptor of the first device.

7. The apparatus of claim 1, wherein the controller to output a control signal to generate a power signal for a boost operation in the first device, and wherein the power signal for the boost operation is to be performed based on the combined power of the hybrid power operation.

8. The apparatus of claim 1, wherein the controller to generate at least one signal to control a charging operation of a battery of the first device corresponding to the first power source, wherein the charging operation to be performed based on at least a portion of the combined power for the hybrid power operation.

9. An apparatus comprising:
a storage area to store instructions; and
a controller to control power in a first device based on the instructions,
wherein the controller to determine a first connection state of the first device and to determine a second connection state of the first device,
the controller to generate one or more first control signals based on the determined first connection state, and the controller to generate one or more second control signals based on the determined second connection state, the one or more first control signals to control one or more first switch devices and the one or more second control signals to control one or more second switch devices to combine power from a first power source and a second power source for a boost operation in the first device;
wherein the first connection state of the first device is based on whether a second device is coupled to the first device;
wherein: the first device comprises a tablet, the tablet including the controller to generate the one or more first control signals to control the one or more first switch devices, and the second device comprises a base removably coupled to the tablet; and
wherein the second connection state of the first device is based on whether an AC adaptor is coupled to the first device.

10. The apparatus of claim 9, wherein the first power source and the second power source are external power sources to be removably coupled to the first device.

11. The apparatus of claim 9, wherein the first power source comprises a battery of the first device and the second power source is received from a second device coupled to the first device, and the second device is external to the first device.

12. The apparatus of claim 9, wherein the first power source comprises a battery of the first device and the second power source comprises an AC adaptor of the first device.

13. A non-transitory computer-readable medium storing instructions for controlling power in a first device, wherein the instructions include:
first code to determine a first connection state of a first device and a second connection state of the first device;
second code to provide one or more first control signals to one or more first switch devices based on the determined first connection state and to provide one or more second control signals to one or more second switch devices based on the determined second connection state, the first and second switch devices to operate to combine power from a first power source and a second power source; and
third code to perform a power control operation using the combined power from the first and second power sources, and wherein the power control operation to include a hybrid power operation;
wherein the first connection state of the first device is based on whether a second device is coupled to the first device;
wherein: the first device comprises a tablet, and the second device comprises a base removably coupled to the tablet; and
wherein the second connection state of the first device is based on whether an AC adaptor is coupled to the first device.

14. The medium of claim 13, further comprising:
code to determine a charge level of the first power source, wherein the first connection state of the first device to be determined based on the charge level of the first power source.

15. The medium of claim 13, wherein:
the first power source and the second power source are to be external power sources removably coupled to the first device,
the first connection state to indicate whether the first power source is coupled to the first device, and
the second connection state to indicate whether the second power source is coupled to the first device.

16. The medium of claim 13, wherein the first power source comprises a battery of the first device and the second power source to be from a second device coupled to the first device, and the second device is external to the first device.

17. The medium of claim 16, wherein the second power source comprises a battery of the second device.

18. The medium of claim 16, wherein the second power source comprises an AC adaptor of the second device.

19. The medium of claim 13, wherein the first power source comprises a battery of the first device and the second power source comprises an AC adaptor of the first device.

20. The medium of claim 13, further comprising:
   code to perform a boost operation based on the combined power corresponding to the hybrid power operation.

* * * * *